United States Patent [19]
Bauer

[11] Patent Number: 5,921,492
[45] Date of Patent: Jul. 13, 1999

[54] LARGE ARBOR FISHING REEL EMBODYING RECESSED DRAG CONTROL KNOB AND ZERO BACKLASH DRAG ENGAGEMENT CLUTCH

[76] Inventor: John M. Bauer, 401 Corral de Tierra Rd., Salinas, Calif. 93908

[21] Appl. No.: 08/524,614

[22] Filed: Sep. 7, 1995

[51] Int. Cl.⁶ ................................................. A01K 89/015
[52] U.S. Cl. ........................... 242/317; 242/295; 242/298
[58] Field of Search ................................... 242/295, 303, 242/298, 322, 282, 317; 192/45

[56] References Cited

U.S. PATENT DOCUMENTS

| | | | |
|---|---|---|---|
| 549,914 | 11/1895 | Gray | 242/303 X |
| 969,235 | 9/1910 | Wollensak | 242/317 X |
| 1,626,357 | 4/1927 | Rinebolt, Sr. | 242/317 X |
| 3,262,652 | 7/1966 | Way | 242/317 X |
| 3,434,676 | 3/1969 | Bogue | 242/303 |
| 4,168,041 | 9/1979 | Moosberg | 242/317 X |
| 4,728,054 | 3/1988 | Pisapio | 242/317 X |
| 5,407,144 | 4/1995 | Ryall | 242/295 |
| 5,411,218 | 5/1995 | Uehara et al. | 242/303 X |

*Primary Examiner*—Donald P. Walsh
*Assistant Examiner*—Emmanuel M. Marcelo
*Attorney, Agent, or Firm*—Jones, Tullar & Cooper, P.C.

[57] ABSTRACT

A fly fishing reel having a large diameter arbor wall defining a large diameter recess within the spool within which recess are contained support structure for rotatably supporting the spool, and a digitally manipulable drag adjustment knob rotatably actuable through use of a single finger to apply a rotary adjusting moment on the knob. Also enclosed within the large diameter central recess of the reel is a zero backlash drag engagement structure operable to eliminate line jerk and to control the direction of rotation of the spool, thus enabling customizing of the reel for right or left handed fishermen.

19 Claims, 3 Drawing Sheets

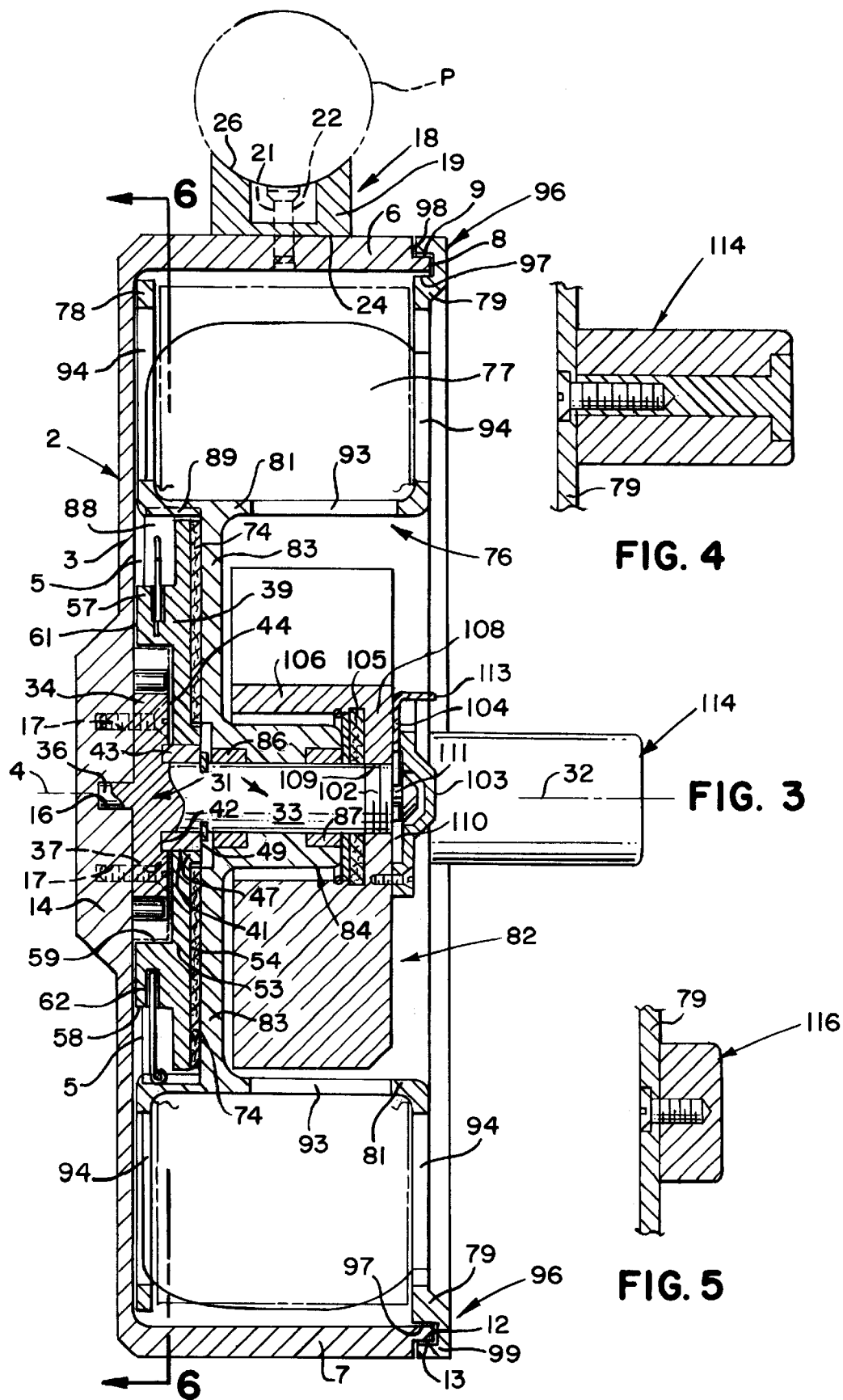

LARGE ARBOR FISHING REEL EMBODYING RECESSED DRAG CONTROL KNOB AND ZERO BACKLASH DRAG ENGAGEMENT CLUTCH

BACKGROUND OF THE INVENTION

1. Field of the Invention

This invention relates to fishing reels, and more particularly to a large arbor fly fishing reel incorporating a drag control knob fully recessed in the large diameter arbor and also incorporating a zero backlash drag engagement clutch means.

2. Description of the Prior Art

Prior United States patents known to exist that relate to fishing reels include the following: U.S. Pat. Nos. 2,059,765; 2,180,566; 2,551,309; 2,306,257; 2,331,249 3,478,976; 3,510,083; 3,478,977; 4,162,049; 4,883,238.

Referring to the patents listed above, U.S. Pat. No. 2,059,765 is not a large arbor reel and does not incorporate the drag mechanism within the large diameter recess defined by the arbor of the reel. As stated in the patent, the purpose of the invention is to exert a drag upon the fish when it runs with a line, and to simultaneously provide a click mechanism that serves as an alarm when the line is drawn outwardly. According to the specification of this patent, reels of this type, before the invention described by this patent, have not been provided with a click mechanism that works in conjunction with the drag mechanism. In this patent, the structures relating to these two functions are wholly outside the arbor of the reel and therefore differentiate significantly in structure and function from the structure disclosed and claimed herein.

U.S. Pat. No. 2,180,566 also does not disclose a reel having a large diameter arbor or recess, does not include mechanism of any kind-within the recess formed by the arbor, and does not incorporate a zero backlash mechanism as disclosed herein. Thus, with respect to providing a drag, this patent teaches the utilization of a break shoe mounted upon a lever arm and which is adjustably pressed against a friction surface of the reel by a spring carried on an adjusting stem the outer end of which is provided with a knurled knob peripherly mounted on the reel and which may be digitally manipulated to increase or decrease the drag. In like manner, the click mechanism in this reel is similar to the drag mechanism with the exception that the break shoe is replaced by a spring-pressed pawl that works in conjunction with circumferentially spaced teeth formed in the break drum. As with most ratchet-type mechanisms, when the pawl moves over the outer peripheral surface of the tooth, and disengages the groove between adjacent teeth, there is a moment in time when back lash occurs prior to reengagement of the pawl with the next succeeding groove between the adjacent teeth.

Accordingly, this patent does not incorporate a zero backlash mechanism.

U.S. Pat. No. 2,551,309 also does not teach a large arbor reel. As clearly illustrated in the drawings of this patent, and described in the specification, the reel is provided with a frame within which a spool is rotatably mounted. Interposed between the spool and one end of the frame is a break drum having ratchet teeth on its inner face arranged to engage a spring-pressed ratchet mounted on the inner face of the spool and having ratchet teeth on its outer face arranged to engage a ratchet mounted in the frame whereby the spool may be rotated in either direction. Clearly then, this patent does not teach a large arbor, nor a drag mechanism mounted within the recess formed by the large arbor, nor does it disclose a zero backlash mechanism.

U.S. Pat. No. 2,306,257 clearly does not disclose a large arbor reel, and does not include within such a non-existant large arbor the ancillary mechanisms for controlling drag and backlash. In fact, this patent, specifically states that one of the objects is to place the drag mechanism entirely on the exterior of the reel. A ratchet mechanism is provided in association with the drag control mechanism enabling free rotation of the reel spool in one direction, as when a fish is being reeled in. As described and illustrated in the patent, the ratchet mechanism is significantly different in structure and operation from applicant's zero backlash mechanism.

Examination of the remaining patents listed above has failed to disclose any large arbor reels that incorporate either or both of the drag control mechanism or anti-backlash mechanism within a large diameter recess formed by the arbor of the reel. Other publications that relate to reels include Dan Bailey's Fly Shop magazine published out of Livingston, Mont.; Cabella's Fly Fishing 1995 magazine, and Trout magazine for the summer of 1989, particularly the article entitled Reel Developments, by C. Boyd Pfeiffer.

A careful review of published material relating to fly fishing reels, particularly reels having large diameter arbors or recesses, has failed to reveal a large arbor fly fishing reel in which essentially all mechanical aspects of the reel are operatively contained within the recess formed by the arbor. Accordingly, one of the principal objects of the present invention is to provide a fly fishing reel that incorporates a large diameter arbor defining a large diameter recess within which is operatively incorporated a drag adjusting knob and drag generating mechanism on the same side as the reel handle to preclude the necessity of having to change the fishing rod from hand-to-hand to adjust a drag knob on the opposite side of the reel from the handle.

Investigation has revealed that drag adjustment knobs that are mounted on the same side of the reel on which the handle or crank is mounted, create a problem in that rotation of the reel with the handle, tends to bring the knuckles of that hand into contact with the drag adjustment knob, leading to skinned knuckles. Accordingly, another object of the invention is the provision of a large arbor fly fishing reel in which the drag adjustment knob is placed on the reel on the same side as the handle, but is recessed so as to prevent contact of the drag adjustment knob by the hand when the reel spool is rotated, as when reeling in a fish. Also, if a fish is pulling line out, a flip of the finger on the drag adjustment knob re-adjusts the drag as necessary to land the fish.

Most reels that have been examined utilize an anti-backlash mechanism consisting of a ratchet and pawl arrangement in which the pawl is dragged over the ends of the teeth and falls between two adjacent teeth. Experience has taught that this mechanism minimizes backlash, but does not eliminate it. Accordingly, another object of the present invention is the provision of a zero backlash mechanism in conjunction with a large arbor fly fishing reel.

A still further object of the invention is the provision of a fly fishing reel having a large diameter spool that enables quick line retrieval and minimizes line coiling memory while providing consistent drag pressure as the line runs out as when a fish is "running" with the line.

Yet another object of the invention is a large arbor fly fishing reel that incorporates mechanism to provide instant drag engagement with no jerk or backlash on the line, here referred to as zero backlash.

Many reels of the fly fishing-type include mechanisms that protrude beyond the side surfaces of the frame or spool. Such protrusions create the risk of the line becoming tangled on such protrusions. Accordingly, another object of the invention is the provision of a large arbor fly fishing reel that eliminates protrusions from the frame and spool on which line might tangle.

When fly fishing, depending upon the circumstances, it is frequently necessary to change the spool to provide a different type of line or leader or tippet. Accordingly, a still further object of the invention is the provision of a large arbor fly fishing reel that enables removal and substitution of the spool without use of tools or extraneous parts that must be detached from the reel with the attendant risk of loss thereof.

Some fishermen are left-handed, while most fishermen are right-handed. Accordingly, yet another object of the invention is the provision of a large arbor fly fishing reel that can be changed from a right-handed to a left-handed mode of operation by a simple rearrangement of the zero backlash mechanism that controls the direction of rotation of the spool.

The invention possesses other objects and features of advantage, some of which, with the foregoing, will be apparent from the following description and the drawings. It is to be understood that the invention is not limited to the embodiment illustrated and described since it may be embodied in various forms within the scope of the appended claims.

SUMMARY OF THE INVENTION

In terms of broad inclusion, the fly fishing reel of my invention comprises a large diameter spool having a large diameter arbor defining a recess within which are contained the digitally manipulable drag adjustment knob and the automatically and instantly actuable zero backlash drag engagement clutch means. Additionally, the spool and frame with which it cooperates are relatively narrow in a transverse dimension, thus facilitating "palming" of the reel for greater control. The digitally manipulable drag adjustment knob, being recessed within the large diameter arbor recess of the spool, enables manipulation of the reel crank or handle without risk of skinned hands on the knob and eliminates a protrusion on the reel, thus eliminating the risk of the line being entangled about such a protrusion.

BRIEF DESCRIPTION OF THE DRAWINGS

FIG. 3 is a vertical cross-sectional view taken in the plane indicated by the line 3—3 in FIG. 2.

FIG. 4 is a fragmentary cross-sectional view of the handle assembly mounted on the spool.

FIG. 5 is a fragmentary cross-sectional view of the counterweight applied to the spool diametrically from the handle to balance the spool.

DESCRIPTION OF THE PREFERRED EMBODIMENT

Figure 2:
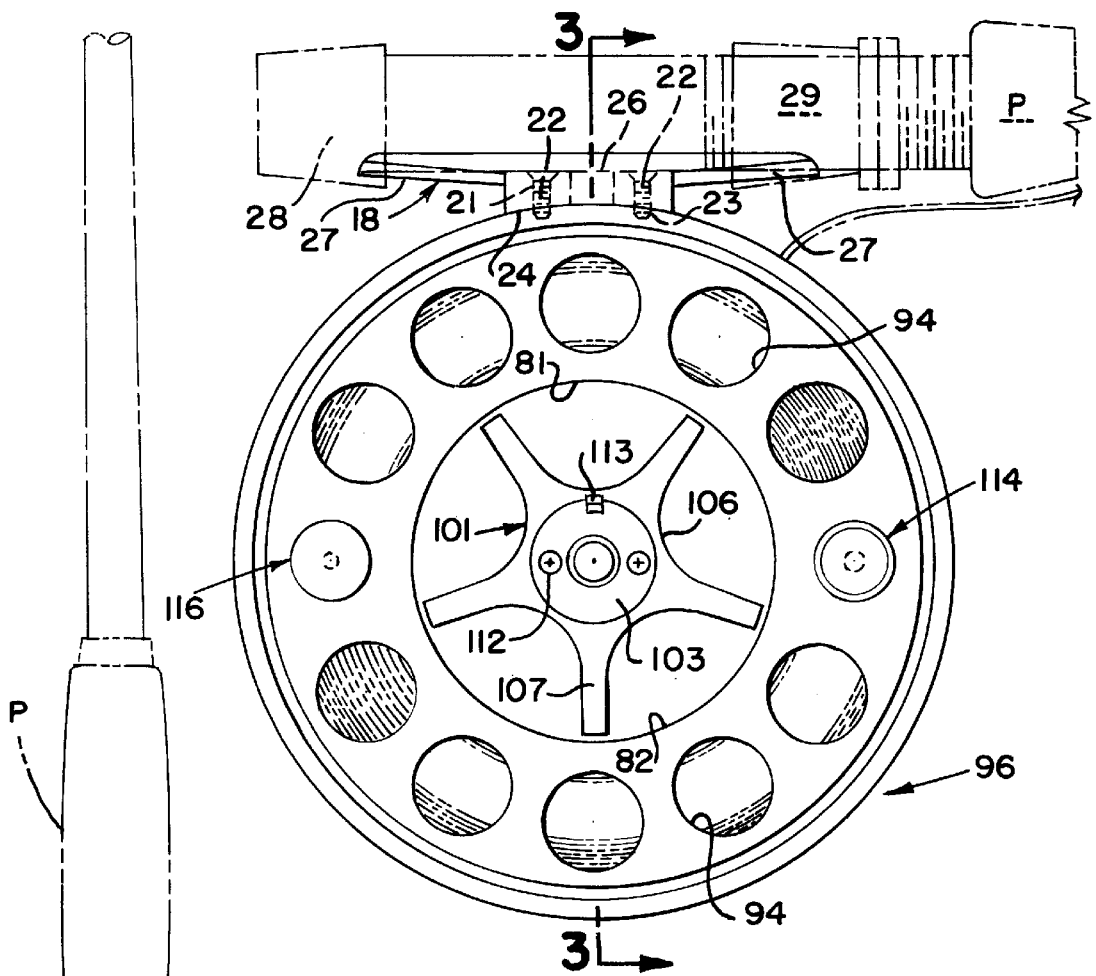
FIG. 2 is a side elevational view of the fly fishing reel taken in the direction of the arrows 2—2 in FIG. 1.

In terms of greater detail, the fly fishing reel of the invention includes a frame member designated generally by the numeral 2 and including a circular back plate 3 symmetrical about a central axis 4 and provided with a shallow peripheral flange 5 from which diametrically oppposed arcuate flanges 6 and 7 project perpendicularly in relation to the back palte and integrally from the peripheral flange 5. The arcuate flange 6 circumferentially subtends an arc that can range from about 30 to 50 degrees, and its outer peripheral edge 8 remote from the base plate is rabbetted as indicated at 9 for a purpose which will hereinafter be explained. The arcuate flange 7 circumferentially subtends a lesser arc of from about 15 to 20 degrees, and its outer peripheral edge 12 lies in a common plane with the edge 8, and is also rabbetted as indicated at 13.

The frame 2 is preferably precision machined from a suitable metal such as aluminum alloy, and the circular back plate portion 3 of the frame is provided centrally symmetrical about the central axis 4 of the back plate with an integral mounting pad 14. Formed centrally in the mounting pad is a guide bore 16, and four threaded mounting bores 17 are also provided in the mounting pad spaced radially about the central guide bore. Preferably, neither the guide bore nor the four threaded mounting bores extend through the full thickness of the mounting pad, thus enhancing the appearance of the reel and eliminating the possibility that an overly long mounting screw will project from the back surface of the back plate and provide a protrusion on which the line may become entangled.

To provide an understanding of the size and precision design of my fly fishing reel, in a reel having a nominal overall diameter of four inches (4"), the overall diameter of the frame is preferably 3.970 inches, while the transverse thickness of the frame between a plane coincident with the outermost surface of the mounting pad 14 and a parallel plane coincident with the edges 8 and 12 of flanges 6 and 7, respectively, amounts to about 1.370 inches. While the nominal thickness of the back plate measured outboard, i.e, surrounding the mounting pad 14, amounts to about 0.080 inches, the thickness of the peripheral flange 5 and diametrically opposed arcuate flanges 6 and 7, measured radially, is increased to 0.125 inches for rigidity and to provide sufficient thickness to accommodate the rabbetted edges.

It will of course be understood that the fly fishing reel frame thus formed constitutes the base or support on which all remaining components of the reel are carried. It should also be understood that the dimensions indicated are merely those that have been selected for a reel of specific diameter, and that these dimensions may be modified as necessary or desirable both in a reel of the size indicated and in larger or smaller reels. Thus, it is not intended that the dimensions indicated constitute a limitation in the scope of the invention presented as defined in the claims that follow.

Figure 1:
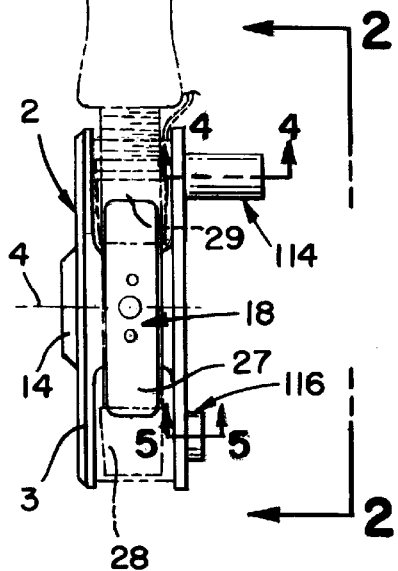
FIG. 1 is a plan view in elevation of the fly fishing reel of my invention shown atached to a fly fishing rod.

For detachable attachment of the frame 2 to a fishing pole P as illustrated in FIGS. 1 and 2, the frame is provided with a foot member designated generally by the numeral 18, and including a pedestal portion 19 having two mounting bores 21 therein adapted to receive two mounting screws 22 that threadably engage corresponding threaded bores 23 in arcuate flange 6, as shown in the drawings. The undersurface 24 of the pedestal is curved to conform to the curvature of the arcuate flange 6, while the upper surface 26 of the pedestal is curved and extended in oppositely projecting rod mounting flanges 27 adapted to be detachably engaged by mounting ferrules 28 and 29 on the fishing rod handle. The ferrule 29 is threadably adjustable on the rod to enable the two ferrules to be moved toward each other to detachably lock the frame to the fishing rod.

The frame of the fly fishing reel is designed to form a protective base for and appropriately support all other components of the reel. Thus, in the reel illustrated herein, there is detachably yet rigidly secured to the back plate 3 and the mounting pad 14, a spindle designated generally by the numeral 31, and preferably fabricated from an appropriate stainless steel. The spindle is symmetrically formed about a longitudinal axis 32, and includes a shaft portion 33 which, at one end, is provided with a radially extending generally circular mounting flange 34 and a cylindrical stub shaft 36 adapted to engage the guide bore 16. Counter-sunk screw holes 37 are formed in the circular flange to receive machine screws 38 adapted to threadably engage the threaded bores 17 formed in the mounting pad. It will thus be seen that the central axis of the frame and the central axis of the spindle coincide, and that the combination of the thickened back plate in the area of the mounting pad, taken with the attachment of the stainless steel mounting flange 34 of the spindle thereto, rigidifies and strengthens the back plate so as to insure that the remaining components mounted on the spindle run true and without wobble to provide a high precision and smoothly operating fly fishing reel.

Mounted on the spindle for true rotation thereon in a selected direction about the central axis 32 is a drag disk designated generally by the numeral 39. The drag disk is conveniently fabricated from aluminum alloy and is symmetrical about a central axis which, when the disk is mounted on the spindle shaft, is coincident with the central axis 32 of the spindle. To rotatably mount the drag disk on the spindle shaft adjacent the spindle mounting flange 34, there is mounted on the spindle shaft an annular bearing ring 41 fabricated from any suitable bearing material that minimizes rotational friction and wear of the component it rotatably supports. As seen in the drawings, one end edge 42 of the annular bearing ring 41 may be nested within a shallow annular channel 43 formed in the surface 44 of the mounting flange 34 at the base of the spindle shaft 33. At its opposite end edge, the bearing ring 41 forms an abutment against which the drag disk abuts to limit and control its axial position on the spindle shaft, and control the position of other portions of the drag disk in relation to associated structure.

Thus, the drag disk includes a hub portion 47 having an inner bearing surface 48 that is rotatably journaled on the outer peripheral bearing surface of the bearing ring 41. The inner bearing surface 48 is intercepted by a radially extending annular stop flange 49 the inner surface 51 of which slidably abuts the end edge 46 of the bearing ring 41 as shown. Extending integrally from the hub portion 47 is an annular disk portion 53 having an inner surface 54 and a parallel outer surface 56 between which is defined the thickness of the drag disk. The outer surface 56 forms a drag surface as will hereinafter be explained.

Formed integrally on the inner surface 54 of the annular disk portion is an annular bead 57 having an outer periphery 58 and an inner circular periphery 59. The annular bead projects axially from the surface of the annular disk portion and its projection is intercepted by an outer end surface 61. Formed in the outer annular surface 58 of the bead 57 is a radially inwardly extending slot 62 that stops short of the inner circular periphery of the annular bead. A radially extending bore 63 is formed in the annular outer peripheral surface of the bead. The purpose of the radially extending annular slot 62 and the bore 63 will be explained hereinafter.

As shown in the drawings, the inner periphery 59 of the annular bead 57 forms a circular surface that is symmetrical about the central axis of the spindle and which is radially spaced about the outer periphery of the circular mounting flange 34 by a precise and predetermined amount. In like manner, the inner surface 54 of the annular disk portion is axially spaced from the adjacent surface 44 of the spindle mounting flange 34. This axial spacing between the adjacent surfaces 54 and 44 is controlled and determined by the thickness of the radially extending annular stop flange 49, which abuts the associated end edge 46 of the bearing ring 41. It should also be noted that the outboard surface 61 of the bead 57 is spaced from the adjacent inner surface of the circular back plate 3, thus enabling free rotation of the drag disk in a selected direction without physical contact of the drag disk with the adjacent inner surface of the back plate and the adjacent flat surface 44 of the mounting flange 34.

From the description above it will be understood that the drag disk is normally enabled to rotate in only one selected direction. This direction of selected rotation is necessarily the same direction in which the reel is manipulated to rewind the line, as when a fish is on the line and it is desired to reel the fish in to be netted. The direction in which the drag disk cannot normally rotate is the direction that corresponds to the line being payed out, as when the fish is permitted to run with the line in a controlled manner against drag imposed by the adjustable drag mechanism hereinafter to be described. To enable such selective rotation of the drag disk, as illustrated in FIGS. 6 and 7, the circular outer periphery 64 of the the circular mounting flange 34 of the spindle is provided with diametrically opposed notches 66, each notch having a flat chordal-like bottom surface 67 intercepted at opposite ends by spaced shoulders or end walls 68 perpendicular to the bottom surface 67 and intercepting the circular periphery 64 of the mounting flange.

Figure 6:
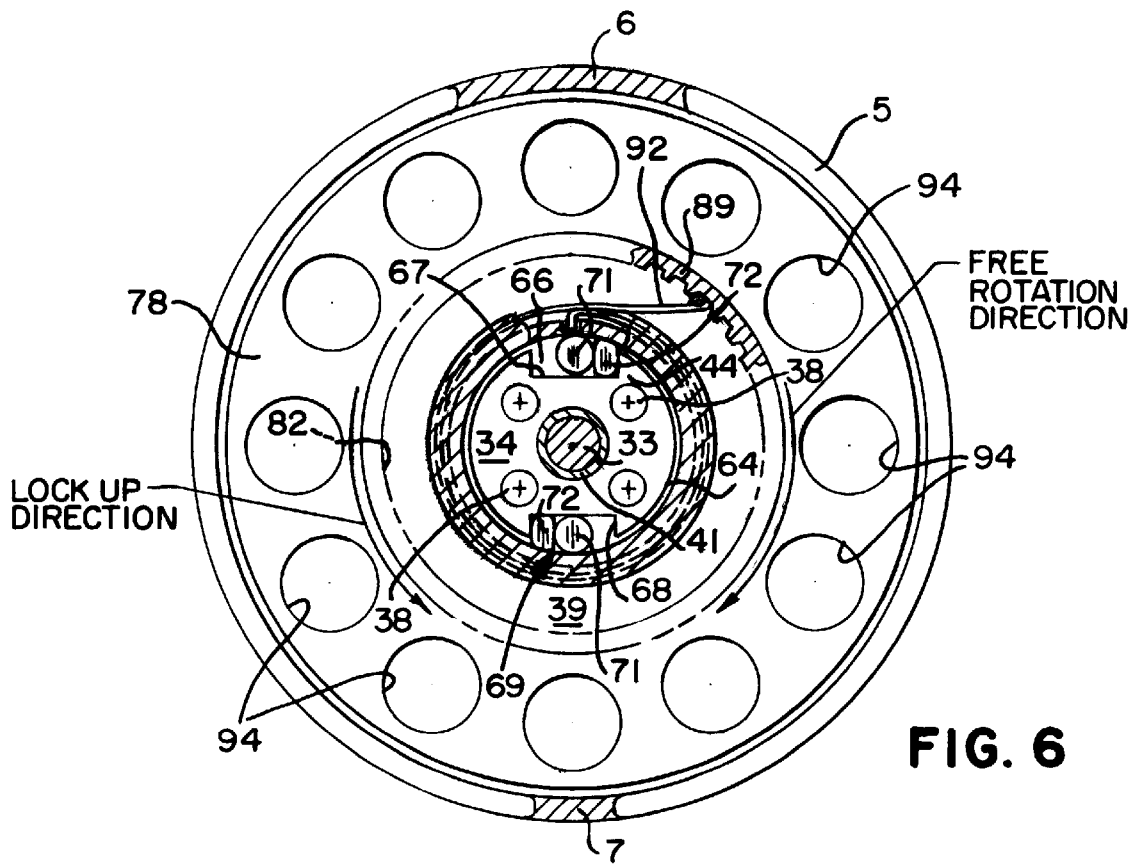
FIG. 6 is a vertical cross-sectional view taken in the plane indicated by the line 6—6 in FIG. 3 and illustrating the zero backlash drag engagement means arranged for clockwise free rotation of the spool as when reeling in a fish.
Figure 7:
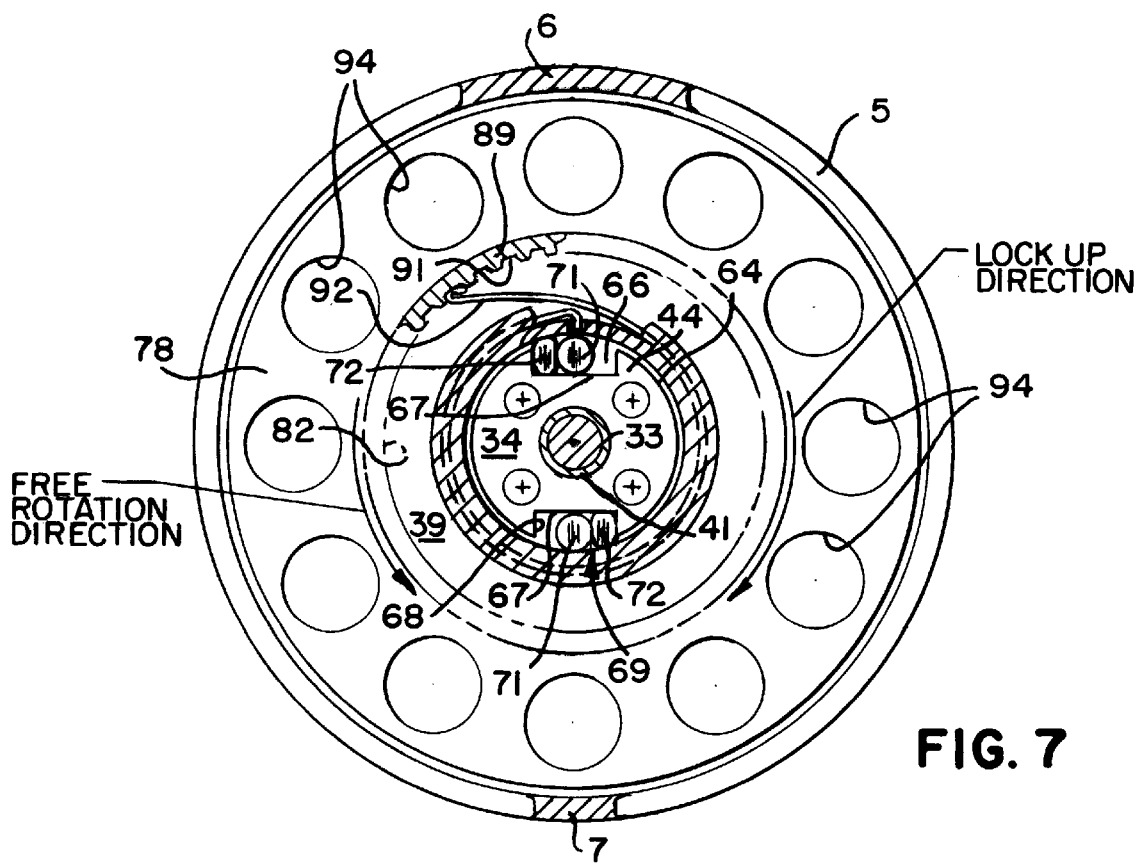
FIG. 7 is a vertical cross-sectional view similar to FIG. 6, but illustrating the zero backlash drag engagement means arranged for counter-clockwise free rotation of the spool.

It should be noted from FIGS. 6 and 7 that the circular outer periphery 64 of the mounting flange 34 is closely circumscribed by the inner circular peripheral surface 59 (FIG. 3) of the drag disk 39, these concentric circular surfaces being spaced apart by about 0.020 of an inch. Confined within the diametrically opposed notches 66 are complementary roller clutch assemblies, each designated generally by the numeral 69, and each including a pair of cylindrical members 71 and 72 captured in the space between the bottom 67 of each notch 66 and the circumscribing inner circular periphery 59 of the drag disk 39.

As will be seen in FIGS. 6 and 7, the cylindrical members 71 in each notch 66 are symmetrical about their respective central axes 73, which axes are perpendicular to associated surface 54 of the drag disk 39 and parallel to the coincident central axes 32 of the frame and the spindle. Additionally, it should be noted that the axes 32 of the cylindrical members 71 are spaced on opposite sides of the coincident central axes of the frame and spindle, and that their axes are coincident with a plane that includes the coincident central axes of the frame and spindle.

As a result of this relationship, the outer periphery of each of the cylindrical members 71 is in physical contact with the associated bottom 67 of the notch in which it is confined, and is also in physical contact with the associated circularly circumscribing surface 59 of the drag disk. Each cylindrical member 71 is also in physical contact with the contiguously arranged cylindrical member 72 that is also in physical contact with the bottom 67 of the notch and the circularly circumscribing surface 59 of the drag disk.

However, there are two important characteristics that differentiate the cylindrical members 71 and 72 in each of the notches. The first of these is that the cylindrical members 71 are formed from an incompressible material such as stainless steel. These cylindrical members 71, because of their position in relation to the circumscribing inner peripheral surface 59 of the drag disk enable free rotation of the drag disk in a direction which tends to roll the cylindrical members 71 against the contiguous cylindrical members 72, which are fabricated from a synthetic resinous material such as a closed-cell elastomer and possess a slight amount of elastic compressibility. Thus, the members 72 impinge resiliently against the circularly circumscribing surface 59 of the drag disk and impose a slight amount of drag on the drag disk to prevent "freewheeling" of the reel. They also retain the cylindrical members 71 in the position of maximum dimension between surface 67 and opposed surface 59, thus preventing the members 71 from being rolled into the gore of diminishing dimension formed between bottom surface 67 and the circumscribing circular peripheral surface 59 of the drag disk.

Thus it is that when the drag disk is attempted to be rotated in a direction to roll the cylindrical members 71 away from the cylindrical members 72, which happens when a fish is on the line and tensioning the line against reel drag, the cylindrical members 71 tend to roll away from the cylindrical members 72, toward the diminishing dimension between the bottom surface 67 and the circularly circumscribing surface 59, and the cylindrical members 71 instantly are caught in the gore to prevent rotation of the drag disk in relation to the spindle. The run of the fish is thus controlled totally by the drag that is imposed on the line by the drag mechanism, while the fisherman is enabled to work the fish toward him by free rotation of the drag disk in its free rotation direction. To reverse the action of the roller clutches so as to enable rotation of the drag disk in the opposite direction, all that is required is that the position of the cylindrical members 72 be moved to the other side of the cylindrical members 71 as illustrated in FIG. 7.

To enable the imposition of selective amounts of rotational drag on the fly fishing reel, there is applied to the outer annular surface 56 of the drag disk a large diameter cork composite annular disk 74, or other appropriate friction material, the inner periphery of which seats about the hub surface 52 of the drag disk while the outer periphery of the cork composite disk is coincident with the outer periphery of the drag disk as shown in the drawings. Compression of the large diameter cork composite annular disk enables instant drag engagement with no jerk or backlash and delivers a very low start-up inertia.

The large diameter cork composite annular drag disk is interposed between the associated parallel surface 56 of the drag disk and an abutting surface of a spool assembly designated generally by the numeral 76. The spool assembly is preferably fabricated from aluminum alloy and includes a circular channel 77 possessing a generally U-shaped cross-section formed by a rear annular wall 78 having inner and outer peripheries and parallel to a front annular wall 79 having inner and outer peripheries. The inner peripheries of the annular walls are integrally connected by a large diameter cylindrical arbor wall 81 that forms the bottom of the U-shaped cross-section of the channel 77 and which also defines a large diameter central recess 82. As illustrated in FIG. 1, the diameter of the central recess 82 is about twice the radial depth of the circular channel, thus placing the spool on which the line is wound closer to the outer periphery of the reel than is sally the case. Stated in other words, the diameter of the cylindrical arbor wall 81, as shown in the drawings, is at least fifty percent (50%) of the diameter of the spool. The functional effect of placing the line so far from the rotational axis of the reel is to lengthen the lever arm, i.e., the distance between the point of tangency of the line on the underlying turns of the line on the spool and the rotational axis of the spool.

Extending integrally and transversely across the large diameter central recess 82 defined by the arbor wall 81 is an annular web or partition wall 83 the outer periphery of which is integral with the inner periphery of the cylindrical arbor wall 81, and the inner periphery of which is integral with a hub 84 adapted to be rotatably journaled on the shaft portion 33 of the spindle 31. The hub 84 is symmetrically disposed about the central axis 32 of the spindle shaft and is provided adjacent opposite ends with bearing rings 86 and 87 rotatably interposed between the hub 84 and the associated portion of the spindle shaft as shown.

It is important to note that the annular partition wall 83 is intermediately positioned between the planes of the front and rear walls 79 and 78, respectively, of the U-shaped channel, to thus define a rear recess portion 88 within which recess is enclosed the mounting base flange 34 of the spindle and the drag disk 39. As shown in the drawings, the portion 89 of the arbor wall 81 that circumscribes the rear recess 88 is provided on its inner periphery with circumferentially spaced recesses 91 that cooperate with a coil of stainless steel wire 92 embedded in the radially extending slot 62 formed in the outer periphery 58 of the bead 57 to form a "clicker" assembly which sounds an alarm when a fish takes the bait and runs with the line, but which is silent when the fish is reeled in by the fisherman.

The rear recess portion 88 is somewhat more shallow than the front recess portion 82 within which is accommodated the axially projecting hub 84 of the spool 76. Additionally, note that the wall 81 defining the outer periphery of the large recess 82 is provided with a multiplicity of transversely extending and circumferentially spaced ventilation slots 93 that function to admit air into the channel 77 within which the line is wound to thus dissipate moisture from the line. To enhance such ventilation, the rear annular wall 78 and the front annular wall 79 are both provided with a multiplicity of circumferentially spaced holes 94 generally spaced medianly between the inner and outer peripheries of these wall members.

To ensure that the spool 76 runs true, the outer peripheral edge portion 96 (FIG. 3) of the front annular wall 79 is provided with a circular channel 97 defined by a shoulder 98 on the one hand and a circumferential flange 99 on the other hand so that the rabbetted edges 9 and 13, respectively, of the frame flanges 6 and 7 project into the channel yet are provided with operating clearance so that the front annular wall 79 does not contact the stationary flanges 6 and 7. Since the flanges 6 and 7 are circumferentially spaced apart, a large portion of the peripheral edges of the front and rear walls of the spool are available for "palming" to control the spool. Accordingly, the outer peripheral edges of these flanges are rounded to provide a more comfortable "feel" when the spool is "palmed".

To control the amount of drag imposed on the spool, there is provided mounted on the free threaded end of the spindle shaft 33 within the front portion of the recess 82 a drag adjustment knob designated generally by the numeral 101 (FIGS. 2 and 3), and preferably formed from high grade aluminum alloy. The drag adjustment knob is operable in conjunction with the threaded end portion 102 of the spindle shaft, and in conjunction with a knob retainer housing 103 and a knob retainer clip 104. To impose an axially directed force on the hub 84 of the spool 76 to cause the annular wall portion 83 of the spool to impose pressure on the large diameter cork composite annular disk 74, thereby compressing the cork annular disk and imposing a frictional drag force on the confronting surfaces of the partition wall 83 of the spool and the annular disk portion of the drag disk 39, all that is required be done is that the adjustment knob be rotated so as to more fully engage the threaded end portion 102 of the spindle shaft. This causes the adjustment knob to apply resilient pressure against a spring pad 105 within the drag adjustment knob, thus transferring such resilient pressure to the bearing impinging the outer end of the hub 84, and imposing such resilient pressure on the large diameter cork composite annular disk 74 and thus selectively adjusting the amount of drag imposed on the spool.

It is important to note that the entire drag adjustment knob is contained within the limits of the recess 82, thus avoiding the protuberance of any portion of the knob and thus preventing the line from becoming entangled with the knob, and also preventing the hand rotating the reel crank 114 from striking the drag adjustment knob and thereby causing injury to the hand. The drag adjustment knob includes a central hub 106 from which radiate five circumferentially spaced lugs 107 (FIGS 2 and 3) adapted to be rotated by a single finger applying pressure to one of the recessed lugs on the knob. A wall 108 formed on the hub is provided with a threaded bore adapted to threadably engage the threaded end 102 of the spindle shaft, which is also provided with an annular slot 109 adapted to cooperate with a spring-pressed retainer clip 104 to lock the drag adjustment knob to the spindle shaft while permitting it to be rotated for adjustment of the drag. For this purpose, the retainer clip 104 is inserted into an appropriately sized slot 110 formed in the knob retainer housing 103 so that the clip may be digitally manipulated within the housing when it is attached to the knob to enable the clip to engage or disengage the annular slot 111 of the spindle shaft. The knob retainer housing 103 is secured to the face of the drag adjustment knob by appropriate screws 112, and the retainer clip is manipulated to lock or unlock the drag adjustment knob from the spindle shaft by applying pressure to the protruding flange 113 of the clip which extends out of the retainer housing 103.

It will thus be seen that a light, streamlined reel having no protrusions projecting from the frame or the spool is provided for comfortable and accurate control by a fisherman, whether he be right or left handed. The recessed drag adjustment knob, being recessed in the same side of the reel as the handle 114 and counter-weight 116 are supported, enables a fisherman to conveniently re-adjust the drag of the reel with the same hand that is being used to actuate the handle, even while the reel spool is being rotated by actuation of the handle.

Having thus described the invention, what is believed to be new and novel and sought to be protected by letters patent of the United States is as follows.

I claim:

1. A fishing reel comprising:
   a frame, said frame including a back plate;
   a spindle extending from said back plate;
   a spool mounted for rotation on said spindle, said spool having an inner annular wall, an outer annular wall and a transverse cylindrical arbor wall therebetween for forming a channel having a U-shaped cross section for receiving fishing line therein in a reeled manner, said spool further including a centrally located cylindrical recess formed by the inner periphery of said cylindrical arbor wall;
   a means for creating a controllable drag on said spool; and
   a drag adjustment knob for adjusting said drag, said drag adjustment knob being contained substantially entirely within said cylindrical recess of said spool.

2. The reel of claim 1 wherein said spool includes a handle projecting from said outer wall for facilitating winding of said line onto said reel, said recess being formed in said outer wall whereby the same hand may be used for both winding of said reel and adjustment of said drag adjustment knob.

3. The reel of claim 1 herein said spool further includes a central hub which fits over said spindle and which extends into said recess, and which is concentric therewith, said drag adjustment knob fitting at least partially over said hub.

4. The reel of claim 1 in which said means for creating a controllable drag on said spool includes a drag plate in contact with said spool, said drag plate being in contact with a clutch means which enables said drag plate to rotate in a first direction, but which prevents said drag plate from rotating in a reverse direction with no back lash.

5. The fishing reel of claim 1 wherein said outer annular wall has an outer diameter which forms the periphery of said spool, wherein the size of the outer diameter of said central recess is at least 50 percent of the size of the outer diameter of said outer annular wall.

6. A fishing reel having a reversible zero-backlash drag mechanism, said fishing reel comprising:
   a frame having a spindle projecting therefrom;
   a drag disk rotatably mounted on said spindle; and
   a zero-backlash assembly in contact with said drag disk whereby said drag disk is free to rotate about said spindle in a first direction, but whereby said drag disk is prevented from rotating about said spindle in a second direction opposite to said first direction for creating a drag, wherein a cylindrical member is located in a notch between said drag disk and said spindle, said cylindrical member being held in generally constant contact with both said drag disk and said spindle by a resilient member located within said notch, whereby said drag disk is prevented from rotating in said second direction by said cylindrical member being wedged between said annular surface and said spindle, but whereby said drag disk is free to rotate about an spindle in said first direction, wherein said notch is symmetrical so that the positions of said cylindrical member and said resilient member are reversible within said notch for reversing the direction of drag.

7. The fishing reel of claim 6 further including a spool mounted on said spindle, said spool being adjustably urged into frictional engagement with said drag disk, such that a controllable rotational drag is created when said spool rotates in said second direction about said spindle against said frictional engagement.

8. The fishing reel of claim 7 wherein said spool includes a central recess defined by an annular cylindrical arbor wall, with a drag adjustment knob mounted on said spindle within said recess for adjustably urging said spool into frictional engagement with said drag disk.

9. The fishing reel of claim 8 wherein said drag adjustment knob does not project substantially beyond said central recess.

10. The fishing reel of claim 8 wherein said spool includes a rear annular wall and a front annular wall which form a channel for receiving a fishing line, said front annular wall having an outer diameter which forms the periphery of said spool, wherein the size of the outer diameter of said central recess is at least 50 percent of the size of the outer diameter of said front annular wall.

11. The fishing reel of claim 6 wherein said drag disk includes an annular surface which concentrically circumscribes said spindle, said notch being located in said spindle, with said cylindrical member being held in generally constant contact with said annular surface of said drag disk.

12. The fishing reel of claim 6 wherein said cylindrical member is formed of stainless steel and said resilient member is a cylindrical disk formed of a resilient polymer.

13. A fishing reel comprising:

a frame for mounting the fishing reel on a fishing rod;

a spindle extending from said frame;

a spool mounted for rotation on said spindle, said spool having a front annular wall, a rear annular wall, and a transverse cylindrical arbor wall therebetween for forming a channel having a U-shaped cross section for receiving fishing line therein in a reeled manner, said spool further including a centrally located recess formed by an inner periphery of said cylindrical arbor wall wherein said front annular wall has an outer diameter which forms the periphery of said spool;

a means for creating a controllable drag on said spool; and a drag adjustment means for adjusting said drag, said drag adjustment means being contained substantially entirely within said centrally located recess of said spool so that projections from said reel are minimized.

14. The reel of claim 13 wherein said spool includes a handle projecting from said front wall for facilitating winding of said line onto said reel, said recess opening toward said front wall whereby the same hand may be used for both winding of said reel and adjustment of said drag adjustment means.

15. The reel of claim 13 which said means for creating a controllable drag on said spool includes a drag plate in contact with said spool, said drag plate being in contact with a clutch means which enables said drag plate to rotate in a first direction, but which prevents said drag plate from rotating in a second direction opposite to said first direction with no back lash.

16. The reel of claim 15 in which said clutch includes at least one first member and at least one second member, said first member being held in resilient contact with said drag plate by said second member, whereby rotation of said spool in said second direction traps said first member against said drag plate, while said first member is not trapped by rotation of said spool in said first direction.

17. The reel of claim 13 wherein said front annular wall and said rear annular wall each have generally equivalent outer diameters which form the outer periphery of said spool, wherein the size of the outer diameter of said central recess is at least 50 percent of the size of the outer diameters of said front and rear annular walls.

18. A fishing reel having a roller clutch drag mechanism, said fishing reel comprising:

a spindle projecting from a frame;

a drag disk rotatably mounted on said spindle;

a spool mounted on said spindle, said spool being adjustably urged into frictional engagement with said drag disk; and a clutch member, said clutch member being held in generally constant contact with said drag disk and said spindle by a resilient member of a resilient polymer, whereby said drag disk is free to rotate about said spindle in a first direction, but is prevented from rotating about said spindle in a second direction opposite to said first direction by said clutch member being caught between said spindle and said drag disk, said resilient member also being in constant contact with said spindle and said drag disk for dampening the rotation of said drag disk in said first direction so that free-wheeling of said spool is prevented.

19. The fishing reel of claim 18 wherein said clutch member is a cylindrical disk formed of stainless steel and said resilient member is a cylindrical disk formed of a resilient elastomeric polymer.

* * * * *

UNITED STATES PATENT AND TRADEMARK OFFICE
CERTIFICATE OF CORRECTION

PATENT NO : 5,921,492
DATED : July 13, 1999
INVENTOR(S) : John M. Bauer

It is certified that error appears in the above-identified patent and that said Letters Patent is hereby corrected as shown below:

Col. 10, line 42
 replace "an"

with - - said - -

Col. 10, line 41
 replace "said annular"

with - - an annular - -

Signed and Sealed this

Twenty-first Day of November, 2000

Attest:

Q. TODD DICKINSON

*Attesting Officer*     *Director of Patents and Trademarks*